US006697382B1

(12) United States Patent
Eatherton (10) Patent No.: US 6,697,382 B1
(45) Date of Patent: Feb. 24, 2004

(54) DISTRIBUTING AND SYNCHRONIZING A REPRESENTATION OF TIME BETWEEN COMPONENTS OF A PACKET SWITCHING SYSTEM

(75) Inventor: William N. Eatherton, Sunnyvale, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/520,299

(22) Filed: Mar. 7, 2000

(51) Int. Cl.[7] .................................................. H04L 7/00
(52) U.S. Cl. ........................ 370/503; 370/519; 370/508
(58) Field of Search ................................. 375/356, 359; 378/503, 509, 512, 508, 519

(56) References Cited

U.S. PATENT DOCUMENTS

| | | | | | |
|---|---|---|---|---|---|
| 4,736,393 | A | * | 4/1988 | Grimes et al. ............... | 375/105 |
| 5,416,808 | A | * | 5/1995 | Witsaman et al. .......... | 375/350 |
| 6,157,957 | A | * | 12/2000 | Bertaud ....................... | 709/248 |
| 6,311,283 | B1 | * | 10/2001 | Gonzalez ..................... | 713/400 |
| 6,326,824 | B1 | * | 12/2001 | Hosoe et al. ................ | 327/160 |
| 6,414,959 | B1 | * | 7/2002 | Asano .................... | 370/395.62 |
| 6,415,325 | B1 | * | 7/2002 | Morrien ....................... | 709/230 |
| 6,430,241 | B1 | * | 8/2002 | Rupprecht et al. .......... | 375/358 |

OTHER PUBLICATIONS

David L. Mills, "Simple Network Time Protocol (SNTP) Version 4 for IPv4, IPv6 and OSI," RFC 2030, Oct. 1996, 20 pages.
Leslie Lamport, "Time, Clocks, and the Ordering of Events in a Distributed System," Communications of the ACM, Jul. 1978, vol. 21, No. 7, pp. 558–565.
David L. Mills, "Improved Algorithms for Synchronizing Computer Network Clocks," Reprint from IEEE Trans. Networks, Jun. 1995, 11 pages.
David L. Mills, "Adaptive Hybrid Clock Discipline Algorithm for Network Timer Protocol," Reprint from IEEE/ACM Trans. Networking, Oct. 1998, vol. 6 No. 5, pp. 505–514.
Douglas Comer, Internetworking with TCP/IP, 4th Ed., 2000, pp. 129–147, 403–411.
"Time Synchronization in Distributed Systems with Java," http://pplab.ice.ntnu.edu.tw/wclan/Thesis/timesync/IMG00001.GIF, Aug. 26, 1997, 1 page.
Thomas J. Chaney and Fred U. Rosenberger, "Timing Parameters for GigaBit Switch Chips (SE, IPP, and OPP)," Sep. 25, 1996, ARL Working Note ARL–96–04, Washington University, St. Louis, MO, 13 pages.

(List continued on next page.)

Primary Examiner—Kenneth Vanderpuye
(74) Attorney, Agent, or Firm—The Law Office of Kirk D. Williams (57) ABSTRACT

Methods and apparatus are disclosed for distributing and synchronizing a global time among components of a packet switching system. A global time is kept by a master component of the switching system. In an implementation, components of the packet switching system determine an update delay from its neighbor(s) which might send it a global time update message. This update delay corresponds to certain transmission and processing delays incurred in propagating global time from one component to another. A master component periodically distributes a current global time to its neighbors, which in turn update their global time value and propagate the updated global time to their neighbors. In this manner, global time is kept synchronized among components in a packet switching system.

13 Claims, 11 Drawing Sheets

OTHER PUBLICATIONS

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

David L. Mills et al., "Internet Timekeeping Aroung the Globe," Reprint from Proc. Precision Time and Interval (PTTI) Applications and Planning Meeting, Long Beach, CA, Dec. 1997, pp. 365–371.

David L. Mills, "The Network Computer as Precision Timekeeper," Reprint from Proc. Precision Time and Interval (PRRI) Applications and Planning Meeting, Reston, VA, Dec. 1996, pp. 96–108.

David L. Mills, "Precision Synchronization of Computer Network Clocks," Reprint from ACM Computer Communication Review, Apr. 1994, 16 pages.

David L. Mills, "Algorithms for Synchronizing Network Clocks," RFC 956, Sep. 1985, 26 pages.

David L. Mills, "Experiments in Network Clock Synchronization," RFC 957, Sep. 1985, 27 pages.

David L. Mills, "Measured Performance of the Network Time Protocol in the Internet System," RFC 1128, Oct. 1989, 20 pages.

David L. Mills, "Internet Time Synchronization: the Network Time Protocol," RFC 1129, Oct. 1989, 29 pages.

David L. Mills, "Network Time Protocol (Version 3) Specification, Implementation and Analysis," RFC 1305, Mar. 1992, 120 pages.

* cited by examiner

DISTRIBUTING AND SYNCHRONIZING A REPRESENTATION OF TIME BETWEEN COMPONENTS OF A PACKET SWITCHING SYSTEM

FIELD OF THE INVENTION

This invention relates to networking and switching systems; and more particularly, the invention relates to distributing and synchronizing a representation of time between components of a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (i.e., greater bandwidth). In trying to achieve these goals, a common approach taken by many communications providers is to use packet switching technology. Packet technology typically allows a plurality of information types to be transmitted over the same transmission lines and using the same packet switching systems and devices.

As used herein, the term "packet" refers to generically addressable packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switches, networks, computer and/or communication devices or mechanisms, or combinations thereof Packet switching systems can comprise many different components, with many of these components having their own independent clocks and independent counters representing a current value of time. In certain systems, it is important that the time counters of these components be synchronized; that is, each of the time counters reflect substantially the same time (within some small tolerance). Prior approaches to synchronize the clocks of the various components rely a common reset line or broadcast bus. However, such approaches are not applicable to systems which do not have a common reset line or broadcast bus. Desired are improved methods and systems for synchronizing a representation of time between components of a packet switching system.

SUMMARY OF THE INVENTION

Systems, apparatus and methods are disclosed for synchronizing a representation of a global time among components of a packet switching system. In one embodiment, the method for synchronizing a first time counter of a first component of a packet switching system with a second time counter of a second component of the packet switching system, where the first and second components are interconnected by one or more links, includes determining a message delay between the first and second components. The second component sends a time synchronization message to the first component. The time synchronization message including a time value of the second time counter. The first component receives the time synchronization message and updates its time counter based on the time value of the second time counter received in the time synchronization message and the determined message delay.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for distributing and synchronizing a representation of time between components of a packet switching system. Such methods and apparatus are not limited to a single packet switching environment. Rather, the architecture and functionality of the invention as taught herein and would be understood by one skilled in the art is extensible to an unlimited number of packet switching environments and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, inter alia, systems, integrated circuit chips, methods, and computer-readable medium containing instructions. The embodiments described hereinafter embody various aspects and configurations within the scope and spirit of the invention. Additionally, flow diagrams are used herein to illustrate embodiments, with some of the embodiments performing certain steps and operations in parallel or in other orders in keeping with the scope and spirit of the invention.

Figure 1A:
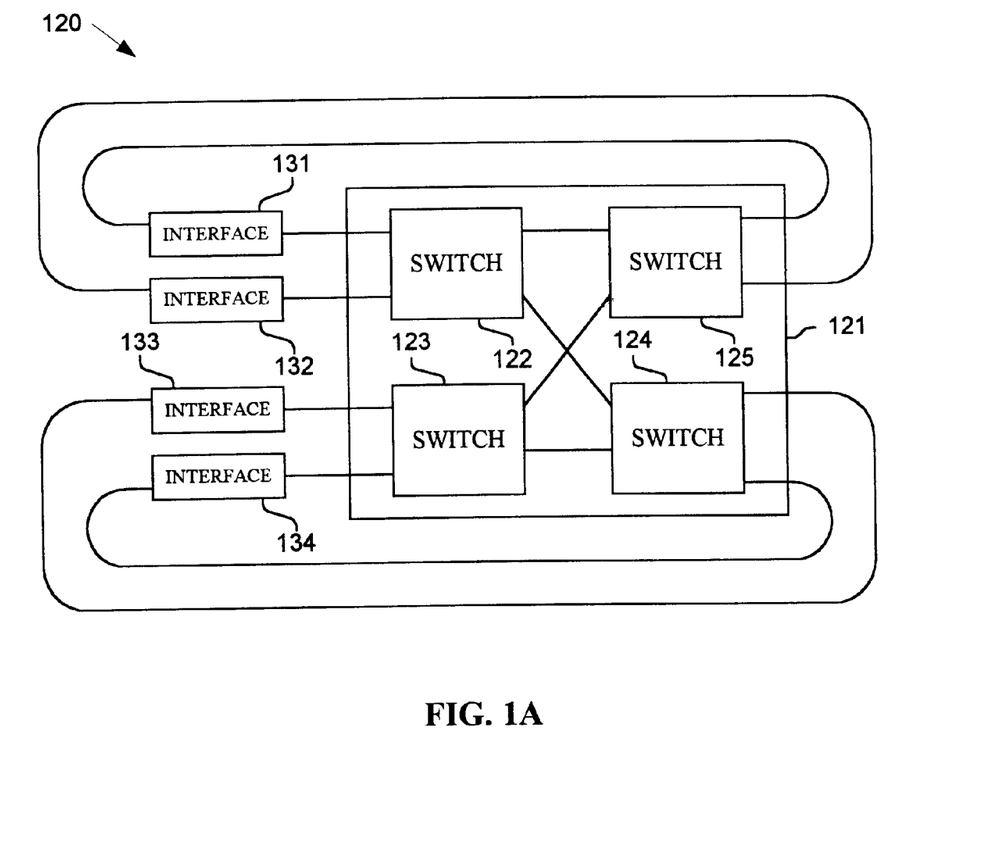
FIGS. 1A–C are block diagrams of a few of many possible embodiments and various operating environments of packet switching systems.
Figure 1B:
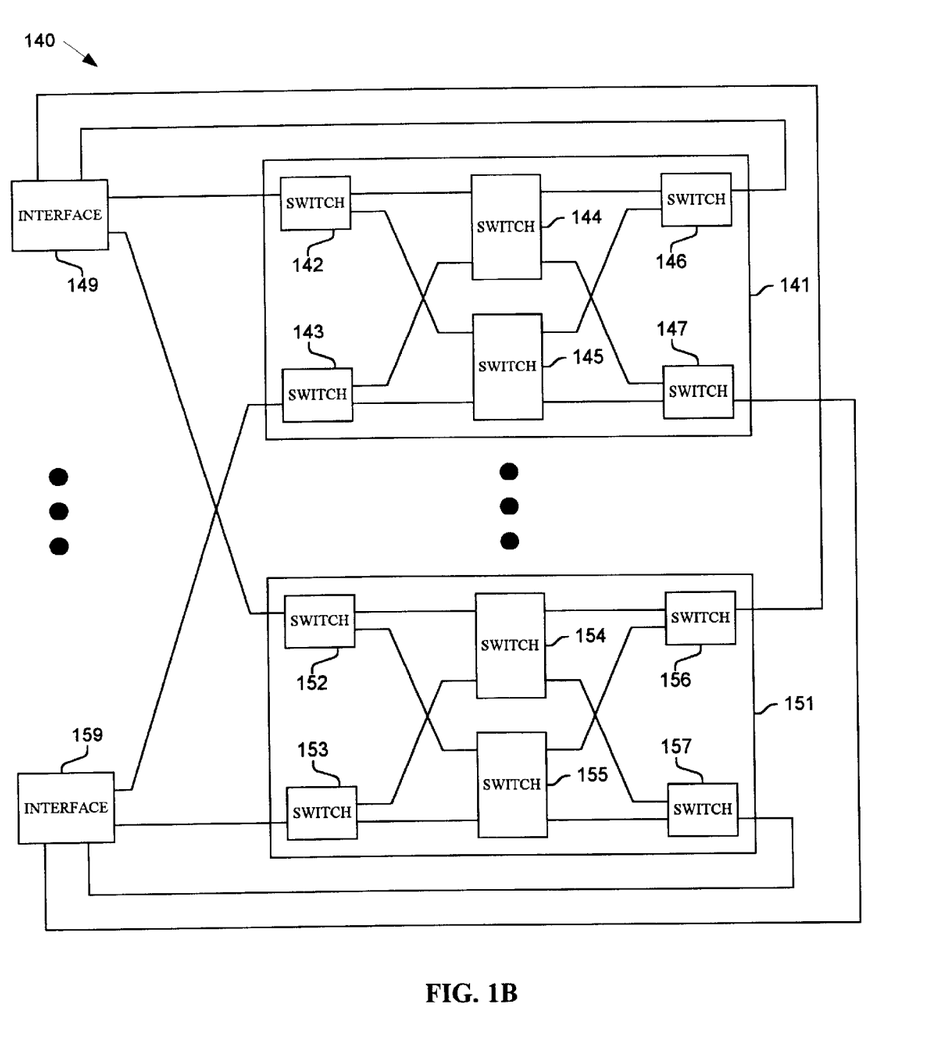
Figure 1C:
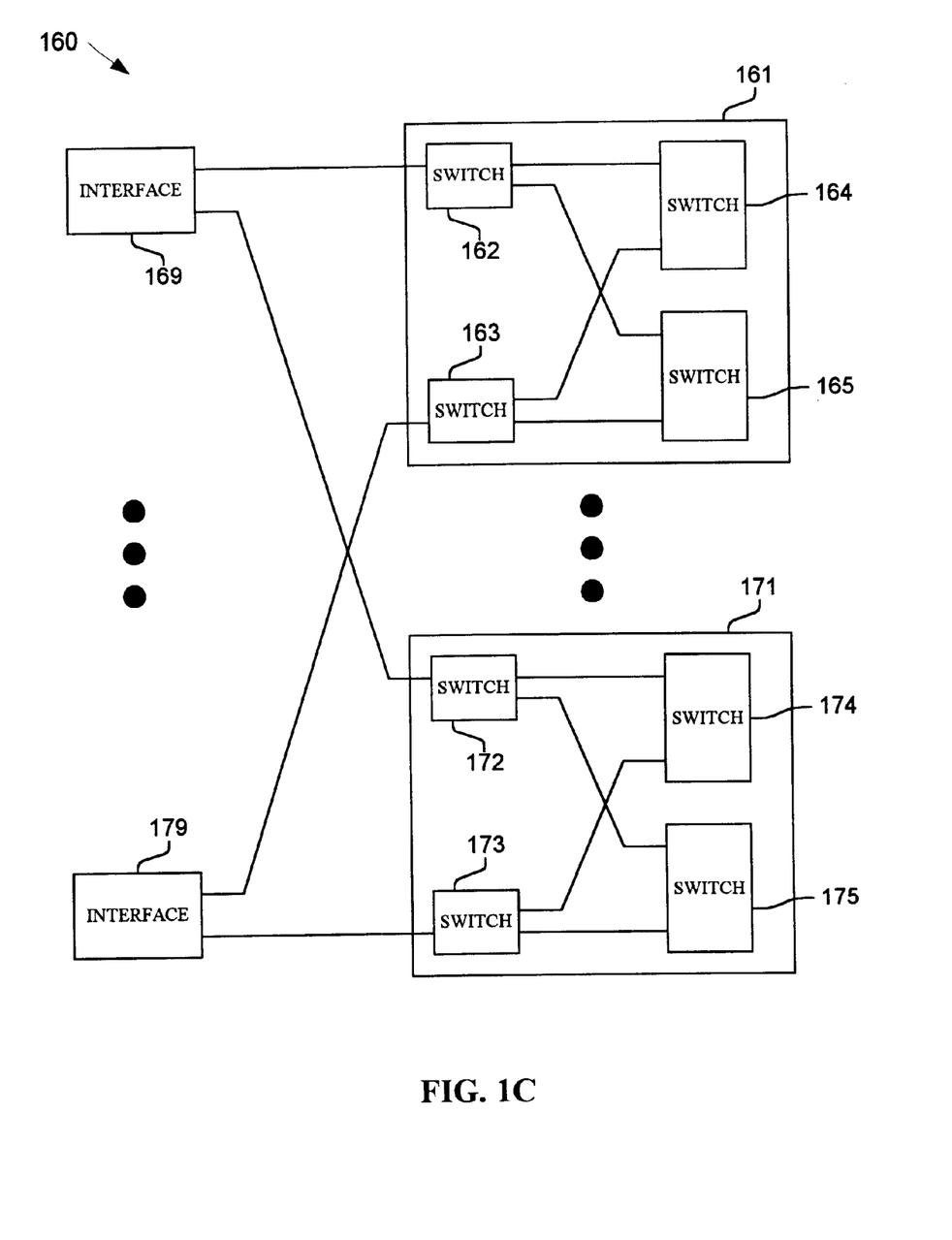

Turning now to the figures, FIGS. 1A–C and their discussion herein are intended to provide a description of various exemplary packet switching systems. FIGS. 1A–C illustrate different forms of packet switching systems. FIG. 1A illustrates an exemplary packet switching system. FIG. 1B illustrates an exemplary packet switching system comprising multiple planes of switching elements. FIG. 1C illustrates an exemplary folded packet switching system comprising multiple planes of switching elements. Of course, the packet switching systems may have more or less elements.

Turning now to FIG. 1A, illustrated is an exemplary operating environment and embodiment 120 of a packet switching system. Packet switching system 120 comprises multiple interfaces 131–134 interconnected over multiple links to an interconnection network 121. Interconnection network 121 as shown comprises multiple switching elements 122–125 also interconnected by multiple links. The interfaces 131–134 may connect via bi-directional connections to other systems (not shown).

Turning now to FIG. 1B, illustrated is an exemplary operating environment and embodiment 140 of a packet switching system. Packet switching 140 comprises multiple interfaces 149 and 159 interconnected over multiple links to interconnection networks 141 and 151. (It is also possible that packet switching networks 141 and 151 could be considered a single interconnection network). Interconnection network 141 comprises switching elements 142–147 interconnected by links. Interconnection network 151 comprises switching elements 152–157 interconnected by links. The interfaces 149 and 159 may connect via bi-directional connections to other systems (not shown).

Turning now to FIG. 1C, illustrated is an exemplary operating environment and embodiment 160 of a folded packet switching system. Packet switching 160 comprises multiple interfaces 169 and 179 interconnected over multiple links to interconnection networks 161 and 171. (It is also possible that packet switching networks 161 and 171 could be considered a single interconnection network). Interconnection network 161 comprises switching elements 162–165 interconnected by links. Interconnection network 171 comprises switching elements 172–175 interconnected by links. The interfaces 169 and 179 may connect via bi-directional connections to other systems (not shown).

In implementing the packet switching systems illustrated in FIGS. 1A–1C, many design decisions are made such as how many switching elements and interconnection networks are to be used and how to break the packet switching system up into implementable components. These decisions are typically based on such considerations, inter alia, as traffic, pin count, and power requirements. Each of the components of the packet switching system is typically connected to one or more other components via one or more links.

Referring to FIG. 1C, packet switching system 160 may be implemented by partitioning the system into multiple components, and in a variety of different partitioning schemes. For example, interface 169 may be implemented as a first component; interface 179 may be implemented as a second component; switching elements 162 and 163 may be implemented as a third component; switching elements 164 and 165 may be implemented as a fourth component; switching elements 172 and 173 may be implemented as a fifth component; switching elements 174 and 175 may be implemented as a sixth component with the appropriate links communicating between the six components to build a functional packet switching system 160. Each of these components has a separate time counter. In certain implementations, these time counters are synchronized to the same value for packet switching system 160 to operate correctly. Embodiments of the synchronization operation will be described in more detail hereinafter.

Many different embodiments for distributing and synchronizing a common time to various components of a packet switching system are possible in keeping within the scope and spirit of the invention. In one embodiment, a time counter value is sent from a master component to all components, with these components updating their respective time counters based on the received time counter value and a time delay in receiving the update message from the master component. Alternatively, the received time value could already account for the delay between the component and the master component. In another embodiment, a master component synchronizes its time counter with neighboring components. Then these neighboring components update their time counter time with their neighboring components, and so on as to propagate the global time through-out the packet switching network.

Figure 2:
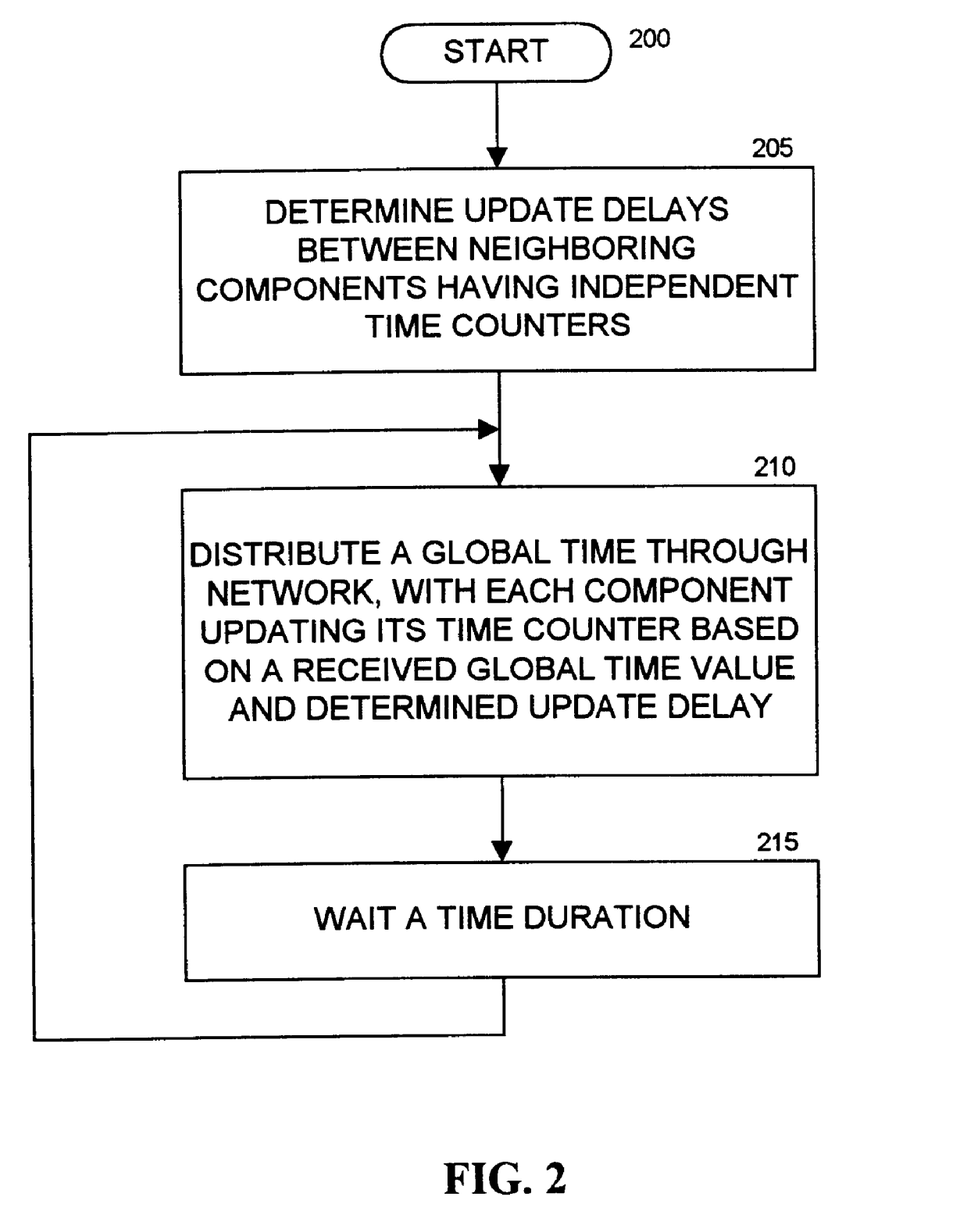
FIG. 2 is a flow diagram illustrating the operation of a packet switching system.

FIG. 2 is a high-level flow diagram of a process for synchronizing the time counters of components within a packet switching system. Referring to FIG. 2, processing begins at step 200 and proceeds to step 205 where the components of the packet switching system determine update delays between their neighboring components. Next, in step 210, a master component initiates distribution of a global time through-out the packet switching network. The global time could be distributed from the master component, or propagated among components. Each component receives a message indicating a representation of the global time and updates its time counter based on the received indication and the determined update delay from the source of the global time (e.g., the master component or a neighboring component). The message indicating the global time could further include the update delay, or the value of global time could already take into account the determined delay. Next, in step 215, a duration of time is waited before repeating the distribution of global time loop. Because each component has its own clocking mechanism, some time counter jitter will occur within the system. A goal of certain embodiments is to align the time counters of all components within a packet switching system within some small amount, such as a few packet times or some small time variance. In this regard, a packet switching system may want to resynchronize every so often, whether this duration be based on a predetermined period of time or a measured amount of jitter. Certain embodiments might also repeat step 205 each time through the loop to determine the current delay. Step 205 may be deleted if the delay remained constant and could be determined without measuring.

Figure 3A:
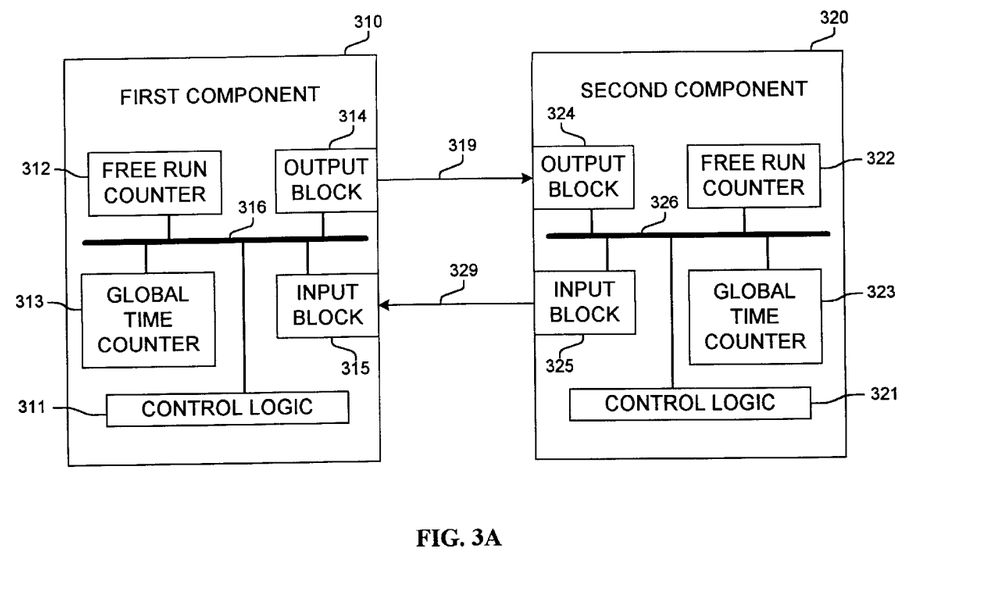
FIG. 3A is a block diagram illustrating one of many possible embodiments for determining delay between two components.

Turning now to FIGS. 3A–3D, illustrated are embodiments for synchronizing two neighboring components. First, FIG. 3A illustrates a block diagram representation of relevant time synchronization portions of two components 310 and 320, which are interconnected via links 319 and 329. Each component 310, 320 comprises some control logic 311, 321, a global time counter 313, 323 for maintaining a value of the global time, an optional free running counter 312, 324 (in certain embodiments described herein, the global time counter 313, 323 could be used in place of the free running counter 312, 324), an output block 314, 324 and an input block 315, 325 for communicating with one or more components, and one or more internal communications mechanisms 316, 326 (shown as a bus for illustrative purposes) for communication between elements of the components 310, 320.

Figure 3B:
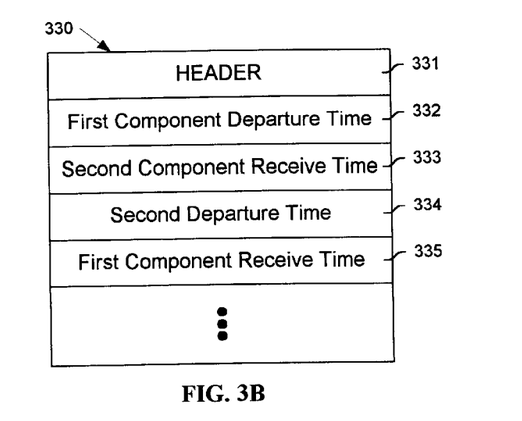
FIG. 3B is a block diagram of a packet format used in an embodiment for determining delay between two components.
Figure 3C:
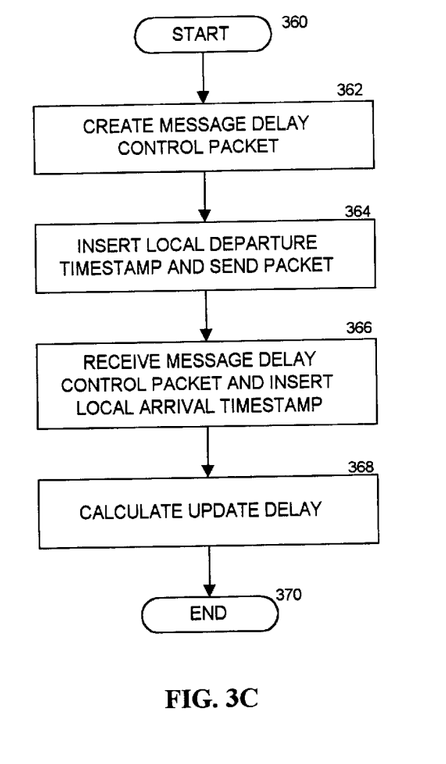
FIGS. 3C–D are flow diagrams illustrating the steps performed in an embodiment for determining delay between two components.
Figure 3D:
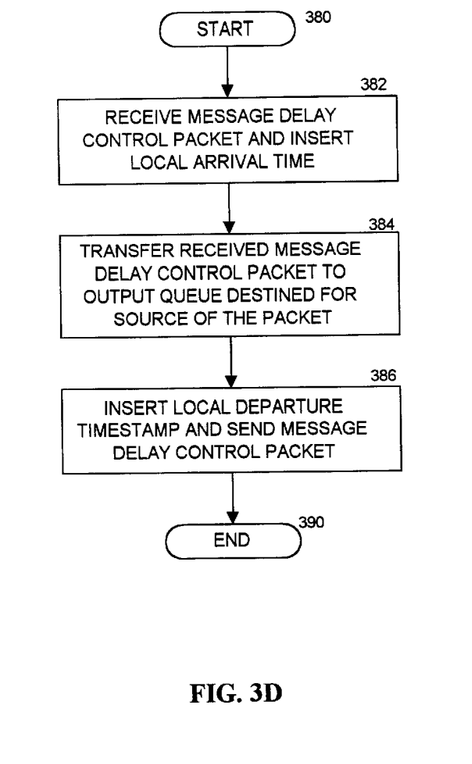

As previously discussed herein, the synchronization process may be divided into two processes: determining an update delay and distributing a global time. Although not required, typically the update delay is determined prior to the distribution of a global time. FIGS. 3B–3D will be used to help illustrate an embodiment for determining the update delay with reference to the block diagram in FIG. 3A.

In certain embodiments and as illustrated in FIG. 3B, a control packet 330 is created and used in determining the update delay between two components. By sending a packet back and forth between two components and recording relative times at each component for the sending and receiving operations, an update delay value can be calculated. As shown, control packet 330 includes a header 331, a transmitter departure time field 332, a receiver departure time field 333, a receiver departure time field 334, and a transmitter receive time field 335. The use of these fields and the delay calculation will now be described using the flow diagrams illustrated in FIGS. 3C–D.

FIGS. 3C–D illustrate flow diagrams of a process for determining an update delay performed by the first and second components 310 and 320 (FIG. 3A) respectively, and in parallel to determine the update delay. Referring first to FIG. 3C, processing begins by the first component 310 at step 360 and proceeds to step 362 where the first component 310 creates a message delay control packet 330 (FIG. 3B) which will be sent to the second component 320 and returned to the first component 310. Next, in step 364, the first component 310 inserts a local departure time from its free run clock 312 (FIG. 3A) (or alternatively its global time counter 313) into the message delay control packet 330 and sends the message delay control packet 330 to the second component 320.

Referring now to FIG. 3D, processing begins by the second component 320 at step 380 and proceeds to step 382 where the second component 320 receives the message delay control packet 330 from the first component 310 and inserts a local arrival time-stamp from its free run clock 322 (FIG. 3A) (or alternatively its global time counter 323) into the message delay control packet 330. Next, in step 384, the message delay control packet 330 is placed in an output queue of the second component 320 destined for the first component 310. Then, in step 386, the second component 320 inserts a local departure time from the same counter used in step 382 into the message delay control packet 330 and sends the message delay control packet 330 to the first component 310.

Returning to the processing of FIG. 3C, in step 366, the first component 310 receives the returned message delay control packet 330 from the second component 320 and inserts a local arrival time-stamp from the same counter used in step 364. Then, in step 368, the first component calculates the update delay. In an embodiment, the update delay is computed using simple algebra using the values of fields 332–335 from the packet 330 (FIG. 3B). First, the round-trip time between the first component 310 and second component 320 is determined by subtracting the value of the first component departure time 332 from the first component receive time 335. Next, the time that packet 330 was in the second component 320 (i.e., the second departure time 334 minus the second component receive time 333) is subtracted from the calculated round-trip time to produce the time the control packet 330 spent being transmitted across links 319 and 320 and processing time to time-stamp the control packet 330 twice. Assuming that the delay is equal going to and from the first component, then the update delay is one-half of the previously calculated value. If this assumption is not valid for a particular embodiment, alternative measurement and calculation mechanisms may be used to determine the update delay. Moreover, if the update delay varies with each packet transmission, then multiple message delay control packets may be sent and an appropriate delay value may be determined. As taught herein, many different embodiments are possible within the scope and spirit of the invention.

Figure 4A:
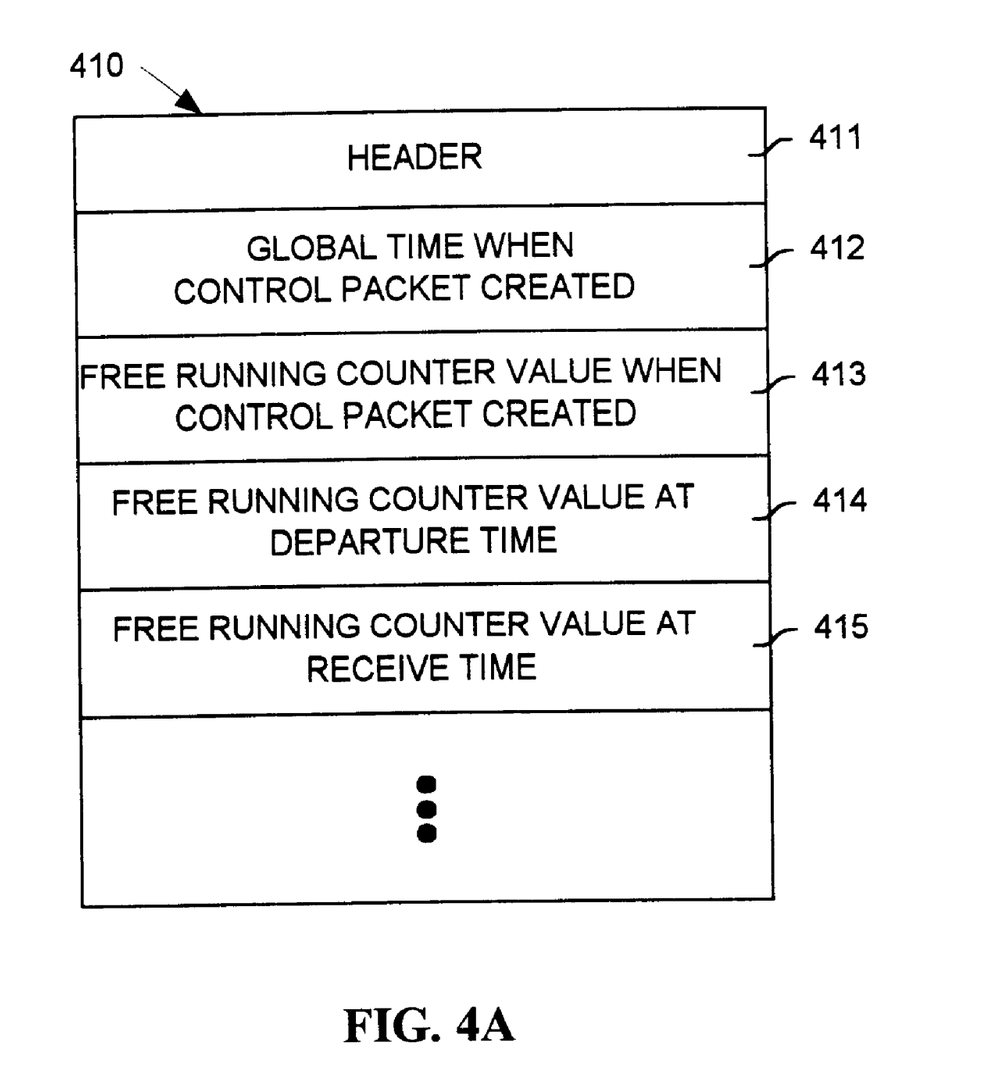
FIG. 4A is a block diagram of a packet format used in an embodiment for communicating a new time counter value between two components.
Figure 4B:
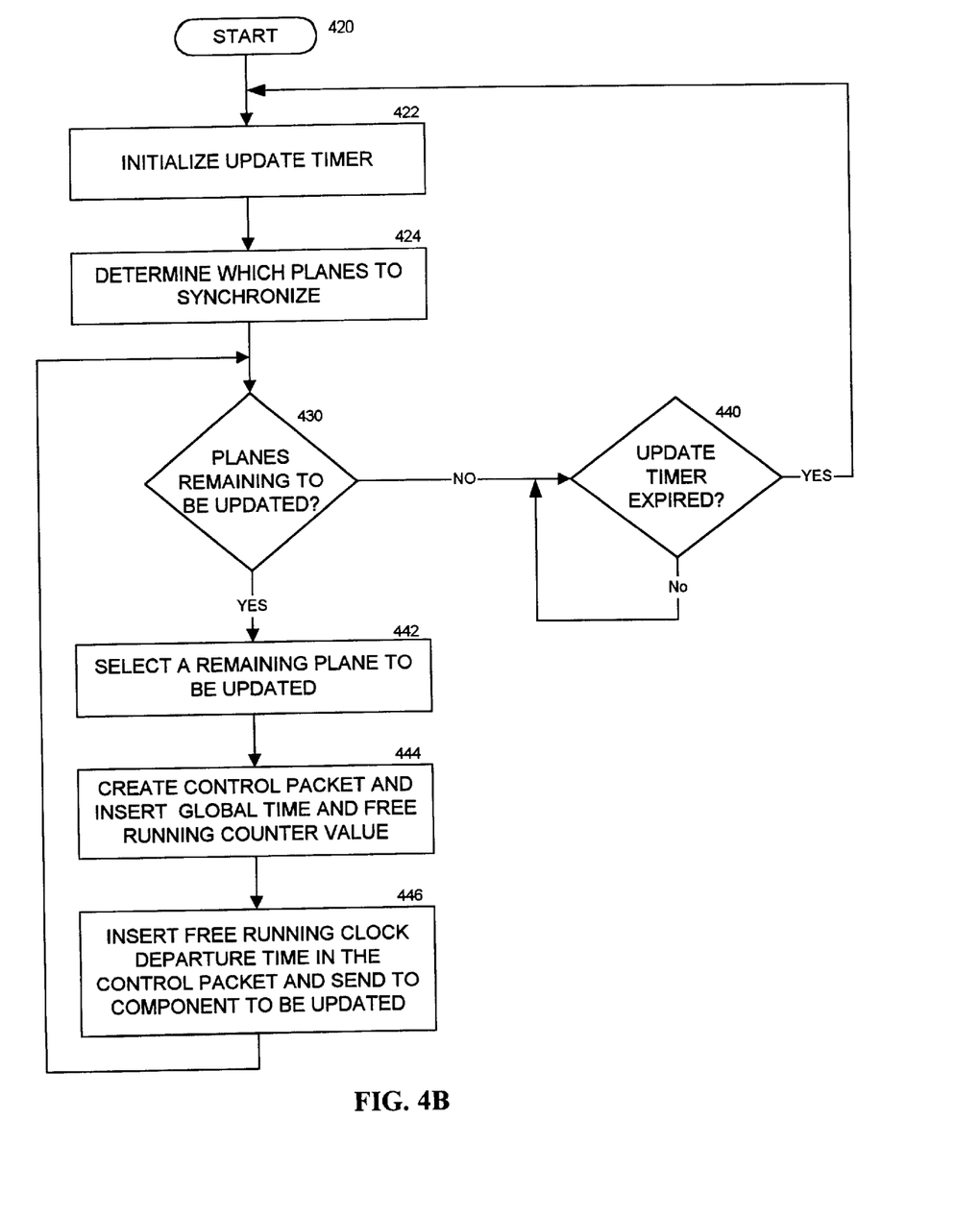
FIGS. 4B–C are flow diagrams illustrating the steps performed in an embodiment for updating a new time counter value between two components.
Figure 4C:
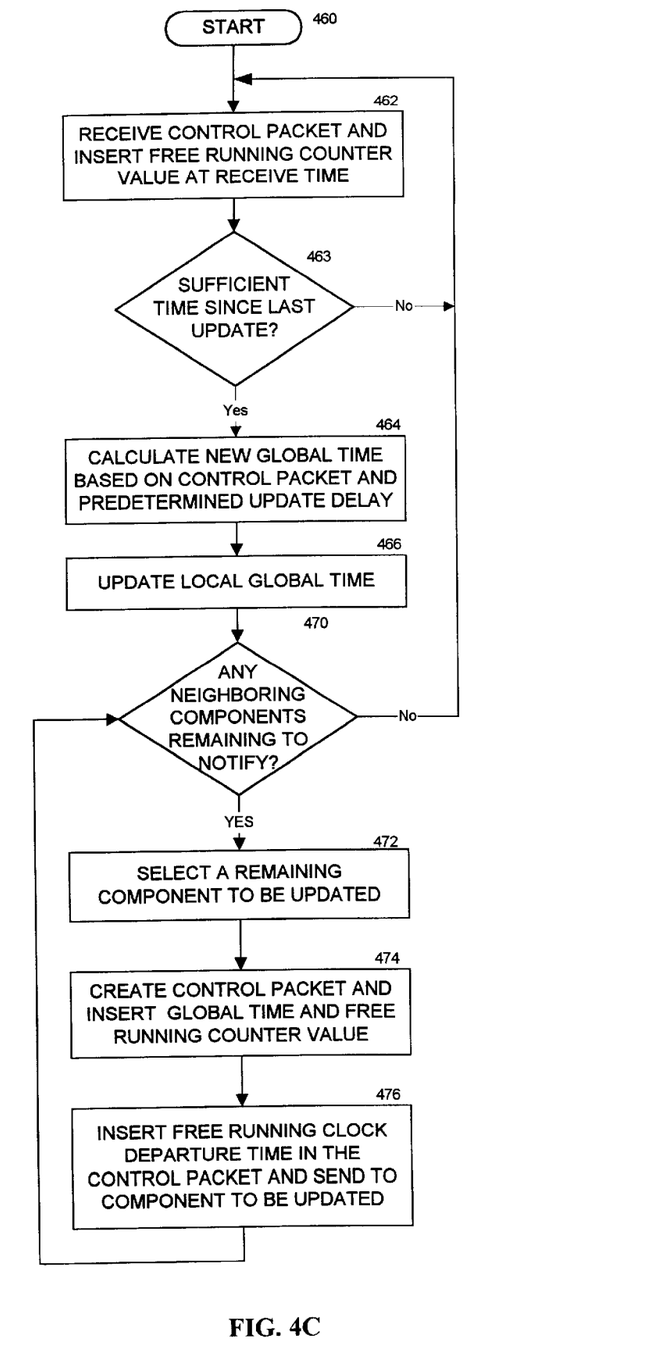

FIGS. 4A–C illustrate an embodiment for distributing the global time through-out a packet switching network, such as packet switching network 140 (FIG. 1B) or 160 (FIG. 1C). Turning first to FIG. 4A, illustrated is a control packet 410 for distributing global time between two neighboring components, such as the first and second components 310 and 320 (FIG. 3A). Control packet 410 contains several fields including a header field 411, a field 412 containing the value of the global time at the sending component when the control packet 410 was created, a field 413 containing the value of the free running counter at the sending component when the control packet 410 was created, a field 414 at the sending component containing the value of the free running counter upon departure from the sending component, and a field 415 containing the value of the free running counter at the receiving component upon receipt.

The use of control packet 410 is further described hereinafter in relation to FIGS. 4B–C. FIG. 4B illustrates the operation of an embodiment of a master component, whose value of global time is used to synchronize the other components of the packet switching system. FIG. 4C illustrates the operation of an embodiment of a component which updates its global time and then proceeds to update its other neighbors with its value of the global time. FIGS. 4B–C use flow diagrams to illustrate their functionality. In some embodiments, certain steps and operations are performed in parallel or in other orders in keeping with the scope and spirit of the invention.

Turning first to FIG. 4B, processing begins at step 420 and proceeds to step 422 where the master component initializes an update timer which is used to determine when to repeat the processing of updating the packet switching system with its global time. In other embodiments, step 422 could be performed between steps 430 and 440, or at various other times. Next, in step 424, the master component determines which of the planes of the packet switching system to update. While there are more planes to update as determined in step 430, a plane to be updated is selected in step 442. Next, in step 444, a control packet 410 (FIG. 4A) is created and the values of the global time and its free running counter are inserted in fields 412 and 413. Next, in step 446, during the operation of sending the created control packet 410 to the selected plane of the packet switching system, the current value of the free running counter of the master component is inserted into field 414 of the control packet 410, and the control packet 410 is sent to the plane of the switching system selected in step 442. Once all planes have been updated as determined in step 430, step 440 is performed to delay until the update timer is expired. After the update timer is expired, processing returns to step 422 to update the packet switching network with its global time.

FIG. 4C illustrates the steps performed by a component receiving a control packet for updating its local version of the global time, and for possibly updating neighboring components. Processing begins at step 460 and proceeds to step 462 where the component receives the control packet 410 (FIG. 4A) and inserts the current value of its free run counter in field 415 of control packet 410 (FIG. 4A). One embodiment uses a timer or counter to determine, as illustrated by step 463, whether a sufficient duration has elapsed since the last update control packet is received, which may or may not me indicative of receiving update packets from multiple neighbors. If sufficient time has not elapsed, the update control packet is ignored and processing returns to step 462.

Otherwise, in step 464, the component calculates its new value of global time based on the information contained in the received control packet and the predetermined update delay. The new global time for the receiving component can be calculated using simple algebra by adding the value of the global time from field 412 to the processing delay time in the sending system (field 414 minus field 413) plus the processing delay time in the current system (free running counter of the current system minus field 415) plus the update delay. In this manner, the global time is updated based on the values of (1) the global time at the sending system, (2) the delays within the sending and receiving systems, and (3) the transmission delays. Once the value for the new global time has been calculated, the global time counter of the component is updated in step 466.

Next, steps 470–476 are performed to propagate the global time to any neighboring components requiring updating. While there are neighboring components to notify with the new global time value as determined in step 470 (there could be zero or more components), a component to be updated is selected in step 472. In some embodiments, all of the neighboring components are not notified, otherwise certain components might receive multiple, and possibly numerous, updates, especially in multipath systems. In one embodiment, an enable bit or bits are used to identify whether to notify any neighboring components and/or which components to notify (or not to notify).

Next, in step 474, a control packet 410 (FIG. 4A) is created with the local values of the global time and free running counter inserted into fields 412 and 413 of control packet 410. Next, in step 476, during the operation of sending the created control packet 410 to the selected component of the packet switching system being updated, the current value of the free running counter of the current component is inserted into field 414 of the control packet 410, and the control packet 410 is sent to the component of the switching system selected in step 472. One all components have been sent control packets 410 to update their respective global counters as determined in step 470, processing returns to step 462 to await the receipt of a control packet 410 for the component to update its global time counter.

Initially, the packet switching system determines or identifies a component to act as the master component for distributing and synchronizing its global time with the other components. However, it is possible that during the operation of the packet switching system, the master component could fail, or possibly some other fault occurs within the packet switching system (e.g., a link or switch element failure) which prohibits global time being distributed from the master component to the other components within the packet switching system. These failure scenarios may be accommodated and/or overcome. In one embodiment, redundancy among master components is provided by having the master component cease acting as the master controller upon detection of a failure, with another component becoming the master controller upon such a failure.

Figure 5A:
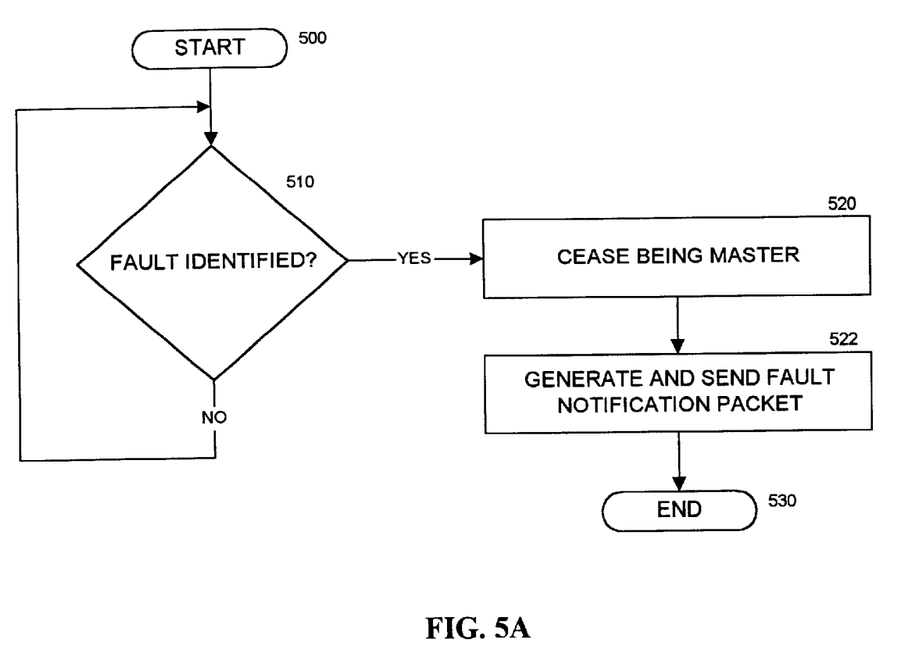
FIGS. 5A–B are flow diagrams illustrating the steps performed in an embodiment for determining which of the components is the current master component.
Figure 5B:
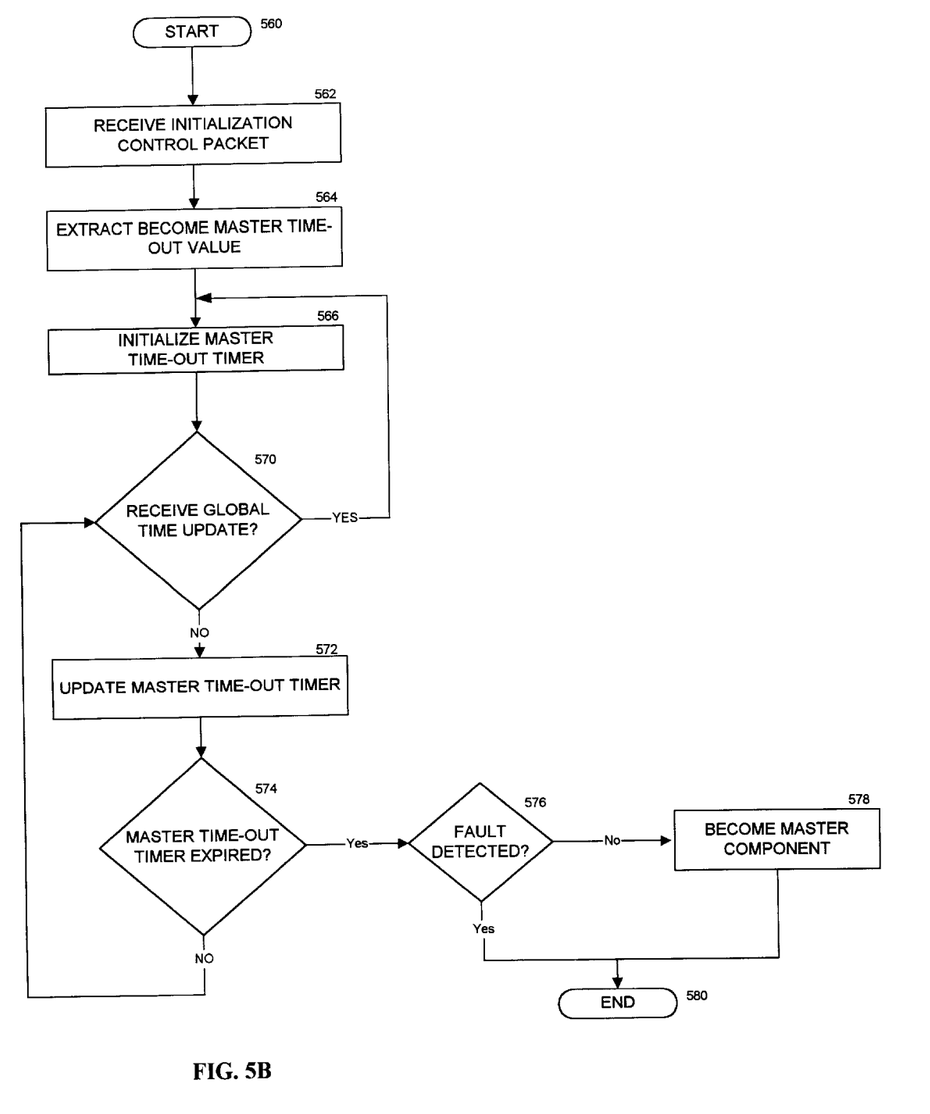

Turning now to FIGS. 5A–B, illustrated are flow diagrams for exemplary embodiments of the master component (FIG. 5A) and of redundant components which could become the master component (FIG. 5B). The processing of FIG. 5A begins with step 500 and proceeds to step 510 where the master controller monitors itself and the packet switching system for failures which inhibit its effectiveness as master controller for distributing global time to the other components of the packet switching system. Upon detection of such a failure, the master controller stops acting as master controller (e.g., stops sending out global time updates) as indicated by step 520. Next, the master controller generates and sends a fault notification packet to an operations system or other alarm system in step 522, and processing of FIG. 5A terminates with step 530. In certain embodiments and with certain failures, the old master controller could be placed as a backup master controller after the fault is corrected.

Turning now to FIG. 5B, illustrated is an embodiment of backup master components to determine when to become the actual master component based on a time-out value. Processing of FIG. 5B begins at step 560 and proceeds to step 562 where the component receives an initialization control packet which indicates a time-out value for the component to use, which is extracted in step 564. Alternatively, one of numerous other mechanisms could also be used, such as a random value or a preprogrammed value. Next, in step 566 a master time-out timer is initialized to the time-out value. Processing then loops among steps 570–574, until either a global update control packet is received at which time the master time-out timer is re-initialized in step 566, or until the master time-out timer has expired as determined in step 574 after the master time-out timer has been updated in step 572. If the master time-out timer has expired, then, if no faults have been detected which would hinder the component from effectively acting as the master controller as determined in step 576, the component becomes the master component as indicated by step 578. Processing of FIG. 5B terminates with step 580.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method comprising:

determining an update delay between a first component and a second component of a system;

the second component sending a time synchronization message to the first component, the time synchronization message including a time value of a second time counter of the second component;

the first component receiving the time synchronization message;

the first component updating a first time counter based on a time value of the second time counter received in the time synchronization message and the update delay;

wherein said determining the update delay includes:

sending an update delay packet between the first and second components;

recording a first time value corresponding to a first transmit time of the update delay packet from the first component;

recording a second time value corresponding to a first receive time of the update delay packet at the second component;

recording a third time value corresponding to a second transmit time of the update delay packet from the second component; and recording a fourth time value corresponding to a second receive time of the update delay packet at the first component.

2. The method of claim 1, wherein the update delay includes a transmission delay and a processing delay.

3. The method of claim 1, wherein the first, second, third and fourth time values are inserted in the update delay packet substantially at the time of their respective occurrence.

4. The method of claim 1, comprising the first component time-stamping the time synchronization message; and wherein the first component updates the first time counter further based on the time-stamp value of the time synchronization message and an approximate current value of time when the update operation is performed.

5. A method, in a packet switching system having a plurality of components interconnected by a plurality of links with each component having an independent time counter, for synchronizing the time counters of the plurality of components, the method comprising:

determining for each component whose time counter is to be updated an update delay between at least one of its neighboring components;

a master component of the plurality of components sending one or more time synchronization messages to a set of master neighboring components;

each of the set of master neighboring components receiving at least one of the time synchronization messages and updating its time counter based on the received time synchronization message and said update delay with the master component;

at least one of the set of master neighboring components, after updating its time counter, sending at least one second time synchronization message to one or more of its neighboring components other than the master component; and at least one of the neighboring components receiving at least one of the second time synchronization messages and updating its time counter based on the received second time synchronization message and said update delay with the sending neighboring component.

6. The method of claim 5, wherein said determining for each component whose time counter is to be updated the updated delay between at least one of its neighboring components includes sending an update delay packet between the master component and each of the set of master neighboring components.

7. The method of claim 6, wherein said determining for each component whose time counter is to be updated the update delay between at least one of its neighboring components includes:

recording a first time value corresponding to a first transmit time of the update delay packet from the master component to a first component in the set of the master neighboring components;

recording a second time value corresponding to a first receive time of the update delay packet at the first component;

recording a third time value corresponding to a second transmit time of the update delay packet from the first component; and recording a fourth time value corresponding to a second receive time of the update delay packet at the master component.

8. The method of claim 7, wherein the first, second, third and fourth time values are inserted in the update delay packet substantially at the time of their respective occurrence.

9. The method of claim 5, comprising each of the set of master neighboring components time-stamping their respectively received time synchronization message; and wherein each of the set of master neighboring components updates its respective time counter further based on the time-stamp value of the received time synchronization message and an approximate current value of time when the update operation is performed.

10. The method of claim 5, further comprising the master component ceasing sending out time synchronization messages, and a backup master component acting as a new master component.

11. The method of claim 5, wherein the master component is a network interface component.

12. A method comprising:

determining an update delay between a first component and a second component of a system;

the second component sending a time synchronization message to the first component, the time synchronization message including a time value of a second time counter of the second component;

the first component receiving the time synchronization message and time-stamping the time synchronization message; and the first component updating a first time counter based on the time value of the second time counter received in the time synchronization message, the determined update delay, the time-stamp value of the time sychronization message, and an approximate current value of time when said updating operation is performed.

13. The method of claim 12, wherein the update delay includes a transmission delay and a processing delay.

* * * * *

UNITED STATES PATENT AND TRADEMARK OFFICE
CERTIFICATE OF CORRECTION

PATENT NO. : 6,697,382 B1
DATED : February 24, 2004
INVENTOR(S) : Eatherton

It is certified that error appears in the above-identified patent and that said Letters Patent is hereby corrected as shown below:

Title page,
Item [56], References Cited, OTHER PUBLICATIONS, replace "David L. Mills et al.," reference, "Aroung" with -- Around -- and "David L. Mills," reference, replace "(PRRI)" with -- (PTTI) --

Column 1,
Line 33, replace "thereof" with -- thereof. --.

Column 5,
Lines 24, 37 and 50, replace "time-stamp" with -- timestamp --

Column 9,
Line 31, replace "updated" with -- update --

Column 10,
Line 29, replace "sychronization" with -- synchronization --

Signed and Sealed this

Eleventh Day of January, 2005

JON W. DUDAS
*Director of the United States Patent and Trademark Office*